A. STEWART.
GRIPPING DEVICE FOR TRACTOR WHEELS.
APPLICATION FILED DEC. 26, 1916.

1,229,541. Patented June 12, 1917.

Inventor
Alexander Stewart

Witness
George Mueller

UNITED STATES PATENT OFFICE.

ALEXANDER STEWART, OF CLINTONVILLE, WISCONSIN, ASSIGNOR TO FOUR WHEEL TRACTOR CO., OF CLINTONVILLE, WISCONSIN.

GRIPPING DEVICE FOR TRACTOR-WHEELS.

1,229,541.  Specification of Letters Patent.  Patented June 12, 1917.

Application filed December 26, 1916. Serial No. 138,922.

*To all whom it may concern:*

Be it known that I, ALEXANDER STEWART, a citizen of the United States, and resident of Clintonville, in the county of Waupaca and State of Wisconsin, have invented certain new and useful Improvements in Gripping Devices for Tractor-Wheels; and I do hereby declare that the following is a full, clear, and exact description thereof.

The present invention relates to new and useful improvements in gripping devices for tractor wheels, more particularly of that type embodied in the co-pending application for patent of Alexander and David S. Stewart, filed July 24, 1916, Serial No. 110884 and embodying calk members loosely mounted upon the tread rim of the wheel, whereby to move upon the tread rim of the wheel during propulsion to prevent accumulations of mud or other matter tending to lessen their gripping function.

It is in general the object of the present invention to increase the efficiency and otherwise improve the structure of devices of this nature, and it is more specifically an object to provide an arrangement wherein the calk members present positive scraping edges to the tread of the wheel, to efficiently remove accumulations therefrom.

My invention contemplates the provision of alternately oppositely diagonally disposed series of calks on the tread of the wheel, and means connecting said calks in a manner permitting their movement about the wheel. It is further an object of my invention to provide an arrangement whereby the connecting means of the calk members serve themselves as efficient calk members.

With the above and other objects and advantages in view, the invention resides more particularly in the novel combination, arrangement and formation of parts more particularly hereinafter described and pointed out in the appended claims.

Referring now more particularly to the accompanying drawings, 5 designates the transversely flat tread portion of a tractor wheel having its edges adapted to slidably engage calk connecting hook members as in the said previous application.

Figure 1:
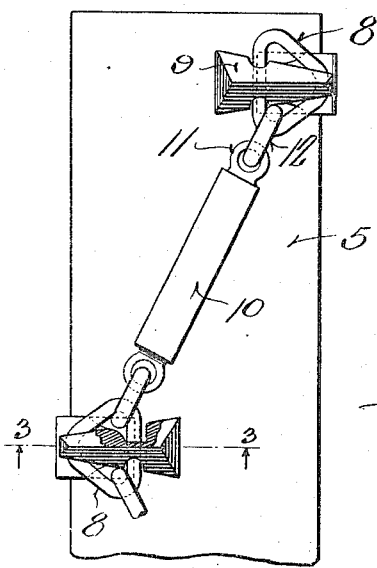
Figure 1 is an elevational view of the tread of a tractor wheel, with a section of my improved gripping means associated therewith.
Figure 3:
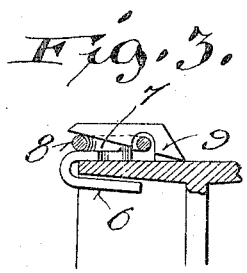
Fig. 3 is a transverse sectional view through a portion of the wheel rim, showing one of the connecting hook members, as indicated by the line 3—3 of Fig. 1.
Figure 4:
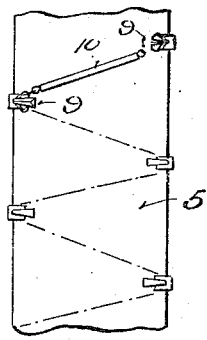
Fig. 4 is an elevational view of a portion of the wheel tread on a reduced scale and showing diagrammatically the arrangement of a series of calk members embodying the present invention.

The present hook members are similar to the hook members of the said previous application, comprising U-shaped hook plates 6, each receiving an edge portion of the wheel tread and provided on one side with an outstanding button 7 having its shank disposed at the free end of said side of the plate whereby to permit the disposition of a preferably triangular connecting link 8 about the shank by inserting the bent plate through said loop. The head of the button is provided at its side adjacent the mouth of the hook plate with an inwardly turned extension 9 adapted to seat on the tread of the wheel when the hook plate is engaged with the side thereof, to thus relieve strain of ground engagement from the head, and the expanse of the head and said extension is utilized as a positive calk member, particularly by beveling the sides and ends of the head and extension, the body formed by said head and extension being taperingly increased in width toward the mouth end of the hook plate. The major calk elements of the type shown in Fig. 1 comprise each an elongated bar 10 of rectangular cross section having eyes 11 formed at its ends which are connected by loop links 12 with adjacent hook carried connecting loops 8 at opposite sides of the wheel tread, these major calk members being, as shown more particularly in Fig. 4, alternately oppositely inclined on the tread of the wheel.

By reason of the loose securement of the major calk members 10 and hook plates 6 to the wheel, they may travel thereabout upon propulsion of the wheel, to dislodge accumulations on the wheel which might tend to impair their gripping efficiency. During such movement, the calk bars 10 would have a rocking action, which would present the inner longitudinal edges of the bars to the tread surface of the wheel, in a manner positively scraping and grinding there against to insure removal of accumulations, this action being in contradistinction to chain or other calk members as embodied in the said previous application, wherein a positive scraping action would not be procured.

Figure 2:
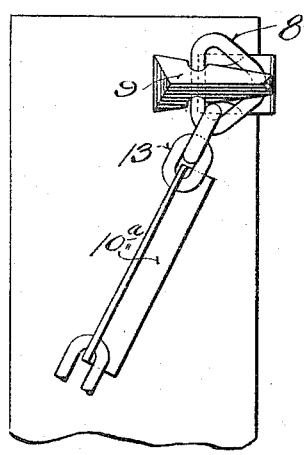
Fig. 2 is a similar view, showing a slightly modified form of my invention.

In Fig. 2 a modified form of major calk member is provided which comprises an angle iron strip 10ª, connected with adjacent pairs of loops 8 by preferably a plurality of loop links 13, whereby one side of the bar projects at a substantially right angle to the tread surface of the wheel, to provide for a positive gripping bite. This bar is upon propulsion of the wheel subjected to a rocking action similar to the bar 10, and thus the longitudinal edges of the base side of the bar 10ª afford positive scraping and grinding means.

Inasmuch as the essential feature of my present invention resides in the provision of positive scraping and grinding edges carried by the calk members which are adapted to move over the tread surface of the wheel with a rocking action, it is appreciated that in various practical embodiments of my invention, certain differences of structure and arrangement may be employed to meet differing conditions, and that the scope of the present invention is limited only by the accompanying claims.

What is claimed is:

1. The combination with a wheel rim, of a plurality of elongated calk bars, the tread surface of the rim being loosely connected therewith to permit creeping movement and an axial twisting of the same upon propulsion of the wheel, said bars being provided with angular scraping edge portions for positive engagement with the tread surface of the rim.

2. The combination with a wheel rim, of a plurality of securing members slidable along opposite edges of the rim, and alternately oppositely inclined elongated calk bars, each having its ends loosely connected with the adjacent securing members to permit axial twisting thereof upon propulsion of the wheel.

3. The combination with a wheel rim, of a plurality of securing members slidable along the opposite edges of the rim and alternately oppositely inclined elongated calk bars, each having its ends loosely connected with adjacent securing members to permit axial twisting thereof upon propulsion of the wheel, said calk bars having flat rim engaging portions and angularly disposed side portions whereby to procure positive scraping and grinding edges for engagement with the wheel rim.

4. The combination with a wheel rim, of a pair of securing members on the opposite edges of the rim, an elongated calk bar, said bar having angular scraping edge portions, and a loose connection between each securing member and the adjacent end of the bar to permit axial twisting of the latter upon propulsion of the wheel to provide a positive scraping of the rim.

5. The combination with a wheel rim, of a pair of securing members on the opposite edges of the rim, an elongated calk bar, said bar having angular scraping edge portions, an eye on each end of the bar, and a loop link loosely connecting each eye and the adjacent securing member to permit axial twisting of the bar upon propulsion of the wheel to provide positive scraping of the rim.

6. The combination with a wheel rim, of a plurality of securing members on the opposite edges of the rim, a plurality of alternately oppositely inclined elongated calk bars, each of said bars having an annular scraping edge portion, an eye on each end of each bar, and a loop link connecting each eye and the adjacent securing member to permit axial twisting of the bars upon propulsion of the wheel to provide a positive scraping of the rim.

In testimony that I claim the foregoing I have hereunto set my hand at Clintonville, in the county of Waupaca and State of Wisconsin, in the presence of two witnesses.

ALEXANDER STEWART.

Witnesses:
F. M. HYDE,
LEVI C. LARSON.

Copies of this patent may be obtained for five cents each, by addressing the "Commissioner of Patents, Washington, D. C."